United States Patent [19]

Graiver et al.

[11] Patent Number: 5,637,668

[45] Date of Patent: Jun. 10, 1997

[54] PREPARATION OF POLYORGANOSILOXANES BY INTERFACIAL POLYMERIZATION

[75] Inventors: Daniel Graiver, Midland; Arnold W. Lomas, Rhodes, both of Mich.; Jani G. Matisons; Arthur Provatas, both of The Levels, Australia

[73] Assignees: Dow Corning Corporation, Midland, Mich.; University of South Australia, The Levels, Australia

[21] Appl. No.: 625,983

[22] Filed: Apr. 1, 1996

[51] Int. Cl.$^6$ .................................. C08G 77/06
[52] U.S. Cl. ...................... 528/33; 528/14; 528/34
[58] Field of Search ........................ 528/14, 33, 34

[56] References Cited

U.S. PATENT DOCUMENTS

| | | | |
|---|---|---|---|
| 3,641,090 | 2/1972 | Bostick | 260/448 |
| 4,493,714 | 1/1985 | Ueda | 55/16 |
| 4,518,547 | 5/1985 | Cuff | 264/4.7 |
| 4,604,442 | 8/1986 | Rich | 528/28 |

FOREIGN PATENT DOCUMENTS 631506  11/1949  United Kingdom.

*Primary Examiner*—Ralph H. Dean
*Attorney, Agent, or Firm*—James L. DeCesare

[57] ABSTRACT

A process for manufacturing high molecular weight polysiloxane copolymers by interfacial polymerization. The polysiloxanes may contain phenylmethyl siloxane blocks and dimethyl siloxane blocks, alternately polymerized together to form an $(A_mB_n)_x$ type copolymer. The interfacial polymerization process is fast, proceeds smoothly at room temperature, and is not reversible, i.e., no cyclic siloxane species are generated. The polysiloxanes can be formed as thermoplastic elastomers suitable for use as sealants, fillers, and films.

8 Claims, No Drawings

PREPARATION OF POLYORGANOSILOXANES BY INTERFACIAL POLYMERIZATION

BACKGROUND OF THE INVENTION

This invention is directed to silicone copolymers prepared by nonaqueous interfacial polymerization, where polycondensation takes place at the interface between reactive starting materials dissolved in separate and immiscible solvents.

A major advantage of interfacial polymerization of silicon containing monomers is the ability to control the structure of the resulting polymer chain and the composition of the copolymer, without the need for a conventional catalyst, and without problems associated with rearrangement during polymerization.

Interfacial polymerization of certain organic monomers is a known polycondensation reaction wherein monomers are dissolved in immiscible solvents. Polymerization occurs when the monomer in one phase diffuses from the bulk of the solution into the interface, and reacts with the monomer from the other phase. The polymerization rate depends on the diffusion rate and reactivity of the functional groups on the monomers.

With respect to our invention, a nonaqueous interfacial polymerization can be conducted using a dihalopolysiloxane (preferably a dichloropolysiloxane) dissolved in one phase, and a potassium silanolate or other metal silanolate dissolved in the other phase. High molecular weight polysiloxanes and potassium chloride or other chloride salt are formed at the interface.

Since the inorganic salt by-product is not soluble in the organic solvent phases, it precipitates and does not interfere with the polycondensation. If the copolymer is insoluble in either solvent phase, it also precipitates and can be removed from the interface.

Among conventional interfacial polymerization reactions are the polycondensation of amines with acetyl chloride to form nylon (i.e., polyamides), and the reaction of alcohols with acids to form polyesters. Interfacial polymerization of these organic monomers typically provides faster polymerization rates than other types of polymerization reactions such as bulk or solution polymerization. Even more important is the fact that because stoichiometry between the monomers need not be precise, a higher molecular weight polymer can be obtained.

This is particularly critical for organic polycondensation reactions where an imbalance of a fraction of a percent causes the extent of polymerization to be greatly affected. Another advantage of interfacial polymerization is the formation of high molecular weight polymers at the interface, regardless of the overall percent conversion of the bulk amounts of the two monomeric reactants still in solution.

Among other of the advantages offered by interfacial polymerization reactions in the synthesis of organic polymers are (i) the ability to prepare infusible polymers; (ii) the ability to synthesize polymers with chemically active substituents as well as heteroatoms; (iii) controlled crosslinking of the polymer structure; (iv) the ability to use cis- and trans-conformation without rearrangement; (v) the ability to prepare optically active polymers without decomposition of the intermediates; (vi) the ability to use short-chain and ortho-substituted ring intermediates; (vii) the ability to use thermally unstable intermediates to form thermally stable polymers; (viii) the ability to form block and ordered copolymers; (ix) the ability to form synthetic elastomers; (x) a direct method of forming polymer solutions and dispersions; (xi) a direct method for the polymerization and formation of polymer coatings and encapsulants; and (xii) a direct method for polymerization of monomers into fibrous particulates, fibers, and films.

We have discovered that many of these advantages can be directly correlated and applied to the interfacial polymerization of silicon containing monomers in forming siloxane copolymers.

BRIEF SUMMARY OF THE INVENTION

Our invention relates to a method of making block copolymers by (A) reacting (i) a first nonaqueous organic solvent solution of an alpha, omega-dihalopolydiorganosiloxane at an interface formed with (ii) a second immiscible nonaqueous organic solvent solution of a silanolate or an organosilanolate of the formula $R''_xSi(OM)_{4-x}$ or $MO(R''_2SiO)_nM$ where $R''$ is an alkyl radical of 1–6 carbon atoms, an aryl radical, an alkenyl radical, or an alkylamino radical; x is 0–2; n is at least one; and M is an alkali metal; and (B) recovering a block copolymer from the interface.

These and other features and objects of the invention will become apparent from a consideration of the detailed description.

DETAILED DESCRIPTION

The interfacial polymerization of organosilicon monomer and oligomer reactants provides structures and combinations of structures which cannot be obtained by other routes. One example is a well-defined structure of a dimethyl/phenylmethyl siloxane block copolymer.

Block copolymers contain linear sequences of comonomer or oligomer A joined to linear sequences of comonomer or oligomer B. By "block copolymer" we mean a sequence distribution in copolymers of the type $(A_mB_n)_x$ or -BBBAABBBAABBBBAAABBBBAAA-, where AA for example may be a dimethyl block, and BBB may be a diphenyl block or a phenylmethyl block. By "dimethyl block", "diphenyl block", and "phenylmethyl block", we mean a sequence of siloxane units of the types shown below:

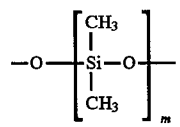

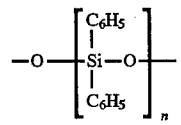

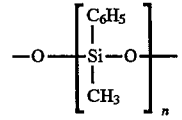

One representative example of a block copolymer is:

-continued

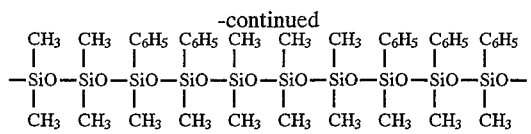

However, a major difference exists between interfacial polymerization of organosilicon reactants according to our invention, compared to previous methods used to polymerize organic monomers, and that is in the use of water as one of the solvents. Although water has been used in many organic systems, no water is used in the interfacial polymerizations according to the method of our invention.

This is because the use of water in the polycondensation of organosilicon monomers could be detrimental, and can lead to a low molecular weight, and a complete loss of control over the polymer structure due to rearrangement and re-equilibration of the polymer in the presence of any residual soluble acid or base. Thus, water is detrimental if an acid or base are formed, which can lead to rearrangement and equilibrium polymerization, i.e., including some formation of cyclic siloxane species. Further, excess of water can lead to low molecular weight silanol terminated end products.

Another difference between our method and previous methods is the fact that if water is present, organosilicon monomers such as those used in this invention react with themselves, whereas in previous methods in organic polymer synthesis the water soluble organic reactants are stable in the aqueous solution and react only across the interface.

But similar to organic polymers prepared by interfacial polymerization, the overall rate of conversion to the polymer is higher than bulk polymerization, provided the polymer is continuously removed from the interface to sustain a constant rate.

Removal of the polymer formed at the interface is relatively simple if the polymer has sufficient mechanical strength. In that case, it can be pulled out of the interface as with polyamides and polyesters. However, removal is more difficult if the polymer is a viscous liquid or a low modulus solid.

As noted, we react an alpha, omega-dihaloorganosiloxane, (i.e., an alpha, omega-dichloropolydiorganosiloxane) in mutually immiscible solvents across the interface with a silanolate or an organosilanolate. The silanolates are alkali-metal salts of organosilanols having the formula $R''_xSi(OM)_{4-x}$ or the formula $MO(R''_2SiO)_nM$. In the formulas, $R''$ is an alkyl radical of 1–6 carbon atoms, an aryl radical, an alkenyl radical, or an alkylamino radical; x is 0–2; and n is at least one.

Suitable alkyl and aryl $R''$ radicals are methyl, ethyl, and phenyl. Suitable alkenyl $R''$ radicals are vinyl, allyl, butenyl, and hexenyl. Suitable aminoalkyl $R''$ radicals are aminopropyl and ethylene diaminopropyl. M is an alkali metal such as lithium, sodium, potassium, rubidium, and cesium. Sodium and potassium are the preferred alkali metals. For purposes of our invention, the value of x is preferably 2; and the value of n is 1 to about 20, preferably 3–10, and most preferably 4–8.

Examples of some suitable silanolate compounds are disodium diphenylsilanolate $(C_6H_5)_2Si(ONa)_2$, disodium dimethylsilanolate $(CH_3)_2Si(ONa)_2$, disodium methylaminopropylsilanolate $(CH_3)[H_2NCH_2CH_2CH_2]Si(ONa)_2$, their potassium equivalents, potassium dimethylsilanolate $KO[(CH_3)_2SiO]_nK$ and potassium phenylmethylsilanolate $KO[(C_6H_5)(CH_3)SiO]_nK$ where n is defined above.

Silanolates can be obtained by the reaction of diorganoalkoxysilanes with alkali-metal hydroxides, or diorganosilanols with alkali metals or alkali-metal hydroxides. Such methods and their details can be found, for example, in British Patent 631,506 (Nov. 3, 1949), and in U.S. Pat. No. 3,641,090 (Feb. 8, 1972), which are incorporated herein by reference.

Synthesis of potassium dimethylsilanolates can also be achieved by the equilibration reaction of octamethylcyclotetrasiloxane with potassium hydroxide. While high viscosities are common when preparing potassium dimethylsilanolates having K:Si mole ratios greater than 1:6, significant lower viscosity silanolates can be made by the incremental addition of the metal hydroxide. This method has the advantage in that it is possible to prepare relatively short chain sizes of potassium dimethylsilanolate polymers. This can be accomplished with a 2K:8Si ratio (16 mole % K), or with a siloxane chain length of eight dimethylsiloxy units. Other potassium dimethylsilanolates can be prepared with lower ratios, i.e., 2K:5Si, 2K:4Si, and 2K:3Si.

Potassium phenylmethylsilanolate polymers can be prepared in a similar fashion to that described above for potassium dimethylsilanolate. In addition, potassium phenylmethylsilanolate polymers can be prepared by condensing KOH with phenylmethylsiloxane hydrolysates, i.e., $HO[(C_6H_5)(CH_3)SiO]_xH$.

Silanolates were prepared by the equilibration reaction of potassium hydroxide or lithium hydroxide with octamethylcyclotetrasiloxane or tetraphenyltetramethylcyclotetrasiloxane for use in interfacial polymerization reactions. These silanolates are shown in Table I. In the table, the abbreviations "diMe" and "PhMe" indicate dimethylsilanolate and phenylmethylsilanolate, respectively.

TABLE I

Silanolates Prepared

| Silanolate | Appearance | Elemental Analysis |
|---|---|---|
| $K^+$ diMesilanolate | Soft, white & waxy | 11.3% K |
| $K^+$ PhMesilanolate (2K:3Si) | Clear crystalline | 18.5% K |
| $K^+$ PhMesilanolate (2K:4Si) | Soft, white & waxy | 16.0% K |
| $K^+$ PhMesilanolate (2K:5Si) | Soft, white & waxy | 13.2% K |
| $K^+$ PhMesilanolate (2K:8Si) | Soft, white & runny | 7.0% K |
| $Li^+$ PhMesilanolate | Soft, white & waxy | 0.2% Li |

Some alpha, omega-dichloropolydiorganosiloxanes usable herein are 1,3-dichloro-1,3-dimethyl-1,3-diphenyldisiloxane,
1,5-dichlorohexamethyltrisiloxane,
1,7-dichlorooctamethyltetrasiloxane,
1,3-dichlorotetraisopropyldisiloxane,
1,3-dichlorotetramethyldisiloxane, and
1,3-dichlorotetraphenyldisiloxane.

There are several criteria for establishing the suitability of any solvent for use in our invention. First, solvent I and solvent II are not miscible. Second, solvent I and solvent II are nonaqueous. Third, solvent I is a good solvent for monomer or oligomer I but not for monomer or oligomer II. Fourth, solvent II is a good solvent for monomer or oligomer II but not for monomer or oligomer I. Fifth, the resulting products must be insoluble in at least one of the phases. Generally, a polar solvent in combination with a non-polar solvent may satisfy these five conditions.

Given these criteria, we found that a polar solvent for the alpha, omega-dihaloorganosiloxane phase was acetonitrile $CH_3CN$, and a non-polar solvent for the silanolate or organosilanolate phase was cyclohexane $C_6H_{12}$.

Generally, reactions of organohalosiloxanes with metal silanolates proceed according to the scheme:

≡Si-X+MO-Si≡ → ≡Si-O-Si≡+MX where M is a Group IA metal such as Na or K, and X is halogen. Thus, where M is Na and X is Cl, for example, the reaction is:

≡Si-Cl+NaO-Si≡ → ≡Si-O-Si≡+NaCl

Such reactions when carried out by methods according to our invention can be conducted without stirring, and at temperatures generally in the range of about 10°–95° C. Typically, interfacial polymerization reactions are carried out when the alpha, omega-dichloropolydiorganosiloxane solution is slowly added to the alkali metal silanolate solution. The solutions are then allowed to stand at room temperature for 24 hours.

Quite unexpectedly, we found that in some of the reactions of potassium phenylmethylsilanolate in cyclohexane and 1,5-dichlorohexamethyltrisiloxane in acetonitrile, elastomeric products (gels) were produced. Further, the polymers contained only low amounts of cyclic siloxane species which were present in the silanolate prior to polymerization. However, in other interfacial polymerizations utilizing potassium phenylmethylsilanolate in cyclohexane with 1,5-dichlorohexamethyltrisiloxane in acetonitrile, the yield was an oil, depending upon the amount of ionic character of the silanolate.

In these reactions, we used various potassium phenylmethylsilanolate chain lengths containing different amounts of ionic character such as 2K:8Si, 2K:5Si and 2K:4Si. We found that the larger silanolate chain species (i.e., 2K:8Si) formed viscous oily products, while the smaller silanolate chain species formed elastomeric products, i.e., gels, after interfacial polymerization. In all cases, the by-product potassium chloride precipitated and was analyzed by X-Ray Diffraction (XRD).

The following examples illustrate our use of potassium phenylmethylsilanolates in the interfacial polymerization reaction.

EXAMPLE I

A potassium phenylmethylsilanolate having the ratio 2K:8Si of potassium to silicon, was prepared by adding to a flask 157.7 grams of phenylmethylsiloxane hydrolysate $HO[(C_6H_5)(CH_3)SiO]_8H$, 60 grams of cyclohexane, and 19 grams of 45% potassium hydroxide (8.55 grams KOH, 0.153M). After reaction, water was removed and the flask was cooled to 60° C. Using a syringe, 60 milliliters of dry acetonitrile was added to the flask as a top layer. Then a solution of 32.32 grams (0.117M, or 0.233 equivalents Cl$^-$) of 1,5-dichlorohexamethyltrisiloxane in 20 milliliters of acetonitrile, was slowly transferred to the top layer of the flask. Upon reaction of the potassium phenylmethylsilanolate in cyclohexane with the 1,5-dichlorohexamethyltrisiloxane in acetonitrile, there was obtained a clear polymeric oil with a molecular weight of 9,455. Nuclear Magnetic Resonance (NMR) and Fourier-Transform Infrared Spectroscopy (FTIR) analysis confirmed formation of the polymer. Infrared analysis showed an increase in methyl groups to phenyl groups, which evidences addition of the trisiloxane backbone to the silanolate. NMR showed only a small amount of polymer branching (i.e., 0.5 mole %), and 16% of cyclic siloxane species. The polymer contained two different difunctional $R_2SiO_{2/2}$ "D" blocks. One block was $(CH_3)_2SiO_{2/2}$, and the other block was $(C_6H_5)(CH_3)SiO_{2/2}$, in the ratio three to eight, respectively.

EXAMPLE II

We repeated Example I using the phenylmethylsiloxane hydrolysate $HO[(C_6H_5)(CH_3)SiO]_5H$, and adjusted the amount of KOH to prepare a potassium phenylmethylsilanolate containing two potassium species to five silicon units (2K:5Si) in cyclohexane. This silanolate yielded a very viscous polymeric fluid when reacted with 1,5-dichlorohexamethyltrisiloxane in acetonitrile. An exotherm was noted during the interfacial polymerization reaction. A polymer molecular weight of 95,500 was determined by Gel Permeation Chromatography (GPC) analysis. NMR showed that the polymer contained $(CH_3)_2SiO_{2/2}$ and $(C_6H_5)(CH_3)SiO_{2/2}$ blocks in the ratio 3:5, with some polymer branching (i.e., 0.92%), and no new formation of cyclic siloxane species over the 8.5% cyclic siloxane species present in the silanolate prior to the reaction.

EXAMPLE III

We repeated Example I using the phenylmethylsiloxane hydrolysate $HO[(C_6H_5)(CH_3)SiO]_4H$, and again adjusted the amount of KOH to prepare a potassium phenylmethylsilanolate containing two potassium species to four silicon units (2K:4Si) in cyclohexane. This silanolate, when reacted with a solution of 64.1 grams (0.231M, or 0.463 equivalents Cl$^-$) of 1,5-dichlorohexamethyltrisiloxane in 30 milliliters of acetonitrile, yielded a polymer that was a clear gel. This elastomeric product was soluble in N-methylpyrrolidone. An exotherm due to the formation of potassium chloride was observed during the reaction.

By using the above procedures, and reacting potassium dimethylsilanolate or potassium phenylmethylsilanolate in cyclohexane with an alpha, omega-dichloropolydiorganosiloxane in acetonitrile, one can prepare block copolymers of different block sizes. This is achieved by using potassium silanolates of various ratios of Si:K.

Other variations may be made in compounds, compositions, and methods described without departing from the essential features of the invention. The forms of invention are exemplary and not limitations on its scope as defined in the claims.

We claim:

1. A method of making a block copolymer comprising (A) reacting (i) a first nonaqueous organic solvent solution of an alpha, omega-dihalopolydiorganosiloxane at or near an interface formed by the first nonaqueous organic solvent solution and (ii) a second immiscible nonaqueous organic solvent solution of a silanolate or organosilanolate of formula $R''_xSi(OM)_{4-x}$ or $MO(R''_2SiO)_nM$ where R" is an alkyl radical of 1–6 carbon atoms, an aryl radical, an alkenyl radical, or an alkylamino radical; x is 0–2; n is at least one; and M is an alkali metal; the second solvent being immiscible in the first solvent, and organic groups on the alpha, omega-dihalopolydiorganosiloxane being different from organo groups on the silanolate or organosilanolate; and (B) recovering the block copolymer at or near the interface.

2. A method according to claim 1 in which the first organic solvent is acetonitrile and the second organic solvent is cyclohexane.

3. A method according to claim 1 in which the alpha, omega-dihaloorganosiloxane is selected from the group consisting of 1,3-dichloro-1,3-dimethyl-1,3-diphenyldisiloxane, 1,5-dichlorohexamethyltrisiloxane, 1,7-dichlorooctamethyltetrasiloxane, 1,3-dichlorotetraisopropyldisiloxane, 1,3-dichlorotetramethyldisiloxane, and
1,3-dichlorotetraphenyldisiloxane.

4. A method according to claim 1 in which the silanolate or organosilanolate has the formula MO(R"$_2$SiO)$_n$M where R" is an alkyl radical of 1–6 carbon atoms, an aryl radical, an alkenyl radical, or an alkylamino radical; n is 1–20; and M is an alkali metal.

5. A method according to claim 4 in which the silanolate or organosilanolate is potassium phenylmethylsilanolate of the formula KO[(C$_6$H$_5$)(CH$_3$)SiO]$_n$K where n is 4–8.

6. A method according to claim 2 in which the alpha, omega-dihaloorganosiloxane is selected from the group consisting of 1,3-dichloro-1,3-dimethyl-1,3-diphenyldisiloxane,
1,5-dichlorohexamethyltrisiloxane,
1,7-dichlorooctamethyltetrasiloxane,
1,3-dichlorotetraisopropyldisiloxane,
1,3-dichlorotetramethyldisiloxane, and
1,3-dichlorotetraphenyldisiloxane.

7. A method according to claim 2 in which the silanolate or organosilanolate has the formula MO(R"$_2$SiO)$_n$M where R" is an alkyl radical of 1–6 carbon atoms, an aryl radical, an alkenyl radical, or an alkylamino radical; n is 1–20; and M is an alkali metal.

8. A method according to claim 7 in which the silanolate or organosilanolate is potassium phenylmethylsilanolate of the formula KO[(C$_6$H$_5$)(CH$_3$)SiO]$_n$K where n is 4–8.

* * * * *